(12) United States Patent  
Wallis et al.

(10) Patent No.: US 7,970,523 B2  
(45) Date of Patent: Jun. 28, 2011

(54) TORQUE ESTIMATOR FOR A MACHINE

(75) Inventors: Michael James Wallis, Washington, IL (US); Paul Alan Ring, Dunlap, IL (US); Giles Kent Sorrells, Metamora, IL (US); Conrad Gene Grembowicz, Peoria, IL (US); Jason Edward Carter, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 1461 days.

(21) Appl. No.: 11/413,187

(22) Filed: Apr. 28, 2006

(65) Prior Publication Data  
US 2007/0255471 A1 Nov. 1, 2007

(51) Int. Cl.  
G06F 7/00 (2006.01)  
G06F 19/00 (2011.01)  
G05B 13/02 (2006.01)  
F02D 7/00 (2006.01)

(52) U.S. Cl. ............ 701/62; 701/99; 701/102; 701/110; 701/50; 700/29; 702/41; 123/399.19; 123/406.23; 123/436; 123/478

(58) Field of Classification Search ...................... 700/62  
See application file for complete search history.

(56) References Cited

U.S. PATENT DOCUMENTS

| 4,616,618 | A | * | 10/1986 | Blocher et al. ................. 123/478 |
| 4,646,697 | A | * | 3/1987 | Grob et al. ................ 123/406.23 |
| 4,674,459 | A | * | 6/1987 | Blocher et al. ................. 123/436 |
| 4,676,215 | A | * | 6/1987 | Blocher et al. ........... 123/339.19 |
| 5,038,616 | A |   | 8/1991 | Schneider et al. |
| 5,329,442 | A | * | 7/1994 | Moshfegh ........................ 700/29 |
| 5,592,386 | A | * | 1/1997 | Gaultier ........................... 701/99 |
| 5,742,522 | A |   | 4/1998 | Yazici et al. |
| 6,275,765 | B1 | * | 8/2001 | Divljakovic et al. .......... 701/102 |
| 6,285,947 | B1 | * | 9/2001 | Divljakovic et al. .......... 701/110 |
| 6,442,511 | B1 |   | 8/2002 | Sarangapani et al. |
| 6,537,177 | B2 | * | 3/2003 | Degroot et al. ................. 477/75 |
| 6,721,680 | B2 |   | 4/2004 | Sorrells et al. |
| 6,757,604 | B2 |   | 6/2004 | Carlson et al. |
| 6,839,638 | B2 |   | 1/2005 | Lueschow et al. |
| 6,842,680 | B2 |   | 1/2005 | Doddek et al. |
| 6,847,917 | B2 |   | 1/2005 | Bechhoefer |
| 6,948,381 | B1 |   | 9/2005 | Discenzo |
| 2002/0115531 | A1 | * | 8/2002 | Degroot et al. ................. 477/92 |

(Continued)

FOREIGN PATENT DOCUMENTS  
WO WO 02/18879 A1 3/2002

*Primary Examiner* — Khoi Tran  
*Assistant Examiner* — Ian Jen  
(74) *Attorney, Agent, or Firm* — Finnegan, Henderson, Farabow, Garrett & Dunner LLP

(57) ABSTRACT

A torque estimator is disclosed for estimating torque on a machine. A computer system may include a torque estimator module located on the machine. The torque estimator module may be configured to receive a plurality of engine parameters, receive a drivetrain component parameter, determine an estimated torque value at the drivetrain component based on the plurality of engine parameters and the drivetrain component parameter. The computer system also may include an analysis module located on the machine. The analysis module may be configured to receive the estimated torque value and the drivetrain component parameter, and update a histogram data structure based on the estimated torque value and the drivetrain component parameter. The analysis module may also be configured to evaluate the histogram data structure in order to determine if excessive torque is being applied to a drivetrain component.

20 Claims, 8 Drawing Sheets

U.S. PATENT DOCUMENTS

| | | |
|---|---|---|
| 2002/0147552 A1* | 10/2002 | Fonkalsrud et al. ............ 702/41 |
| 2003/0093205 A1 | 5/2003 | Carlson et al. |
| 2003/0193310 A1 | 10/2003 | Raftari et al. |
| 2004/0122618 A1 | 6/2004 | Suzuki et al. |
| 2005/0247073 A1 | 11/2005 | Hikawa et al. |
| 2009/0132145 A1* | 5/2009 | Angeby ........................ 701/102 |

* cited by examiner

TORQUE ESTIMATOR FOR A MACHINE

TECHNICAL FIELD

The present disclosure relates generally to a torque estimator for a machine, and more particularly, to a torque estimator for a machine that may estimate torque based on drivetrain parameters.

BACKGROUND

Because excessive torque on a machine component may lead to failure of the component, it is often desired to know, during operation of a machine, how much torque is being applied to one or more locations on the machine and whether such torque is excessive. For example, a machine having a drivetrain, e.g., an engine, torque converter, transmission, driveshaft, differential, and axle shafts, generates and/or transmits torque all along the drivetrain during operation. The torque at these locations provides the power to perform the specific work functions demanded, but also creates stresses on the components, thereby impacting the life of the various portions of the drivetrain. Therefore, it is desired to have a torque estimator that can estimate the torque applied to various drivetrain components in real time as the machine operates and provide an indication if excessive torque is being applied to the drivetrain component for which torque is being estimated.

One method of estimating torque at various locations on a machine is described in U.S. Pat. No. 6,757,604 (the '604 patent) issued to Carlson et al. on Jun. 29, 2004. The '604 patent describes a method and apparatus for determining a value of torque at a desired location on a machine. The method of the '604 patent includes choosing the desired location, determining an operating condition relevant to the desired location, determining a plurality of parameters of the machine, and determining a torque value at the desired location as a function of the operating conditions and plurality of parameters. Various neural networks and equations are used to determine torque value.

Although the system of the '604 patent may estimate torque at various locations on a machine using a neural network or equation, it may not be applicable to determining imminent component failure in real time onboard a machine. In particular, because the system of the '604 patent may use neural networks and equations to merely determine torque, it may be inapplicable to detecting imminent component failure in real time onboard a machine using a data structure, such as, for example, a histogram that may represent a duration of time the machine spent operating at specific combinations of estimated torque and another drivetrain component parameter.

The system of the '604 patent may estimate torque at various locations on a machine using a relatively complex arrangement of input conditions, parameters, neural networks and equations. The system of the '604 patent, however, may be unable to estimate torque values, such as, for example, torque converter output torque and differential pinion torque using a more limited number of engine or drivetrain parameters. Processing a more limited number of parameters may be desirable for reasons related to improving performance of a torque estimating module by reducing computing cycles, data bus traffic, or the like.

Although the arrangement of neural networks and equations in the system of the '604 patent may estimate torque at various locations on a machine, the system may not be applicable to automatic configuration on various machines based on machine type. For example, the method of the '604 may not include an ability to select appropriate neural networks or equations based on a variable that identifies a machine type on which the torque estimator may be operating.

The disclosed system and method are directed to overcoming one or more of the problems set forth above.

SUMMARY OF THE INVENTION

In one aspect, the present disclosure is directed to a computer system for determining imminent failure of a machine drivetrain component. The computer system may include a torque estimator module on the machine configured to receive a plurality of engine parameters, receive a drivetrain component parameter, and determine an estimated torque of the drivetrain component. The computer system may also include an analysis module on the machine configured to receive the estimated torque value from the torque estimator module and the drivetrain component parameter, and update a value stored in a histogram data structure based on the estimated torque value and the drivetrain component parameter.

In another aspect, the present disclosure is directed to a method for determining torque on a drivetrain component of a machine. The method may include receiving a plurality of engine parameters, receiving a drivetrain component parameter, and determining an estimated torque value at the drivetrain component based on the plurality of engine parameters and the drivetrain component parameter. The estimated torque value and the drivetrain component parameter may be provided to an analysis module on the machine, and a histogram data structure may be updated based on the estimated torque value and the drivetrain component parameter.

In another aspect, the present disclosure is directed to a computer readable medium for use on a computer system, the computer readable medium having computer executable instructions for performing a method. The method may include receiving a first engine parameter and a second engine parameter, receiving a drivetrain component parameter, and determining an estimated torque value at the drivetrain component. The method may also include providing the estimated torque value and the drivetrain component parameter to an analysis module, and updating a value stored in a histogram data structure based on the estimated torque value and the drivetrain component parameter.

DETAILED DESCRIPTION

Figure 1:
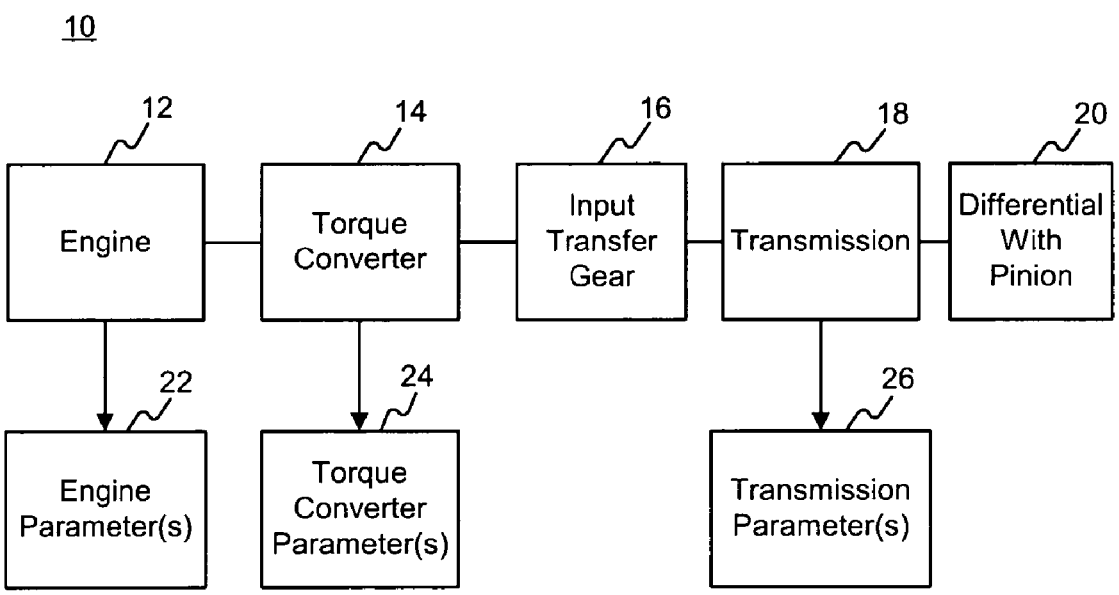
FIG. 1 is a block diagram representation of an exemplary machine drivetrain.

FIG. 1 is a block diagram representation of an exemplary machine drivetrain 10. In particular, drivetrain 10 may be a drivetrain suitable for use in a fixed or mobile machine that performs some type of operation associated with an industry such as mining, construction, farming, transportation, or any other industry known in the art. For example, drivetrain 10 may be disposed on an earth moving machine such as an excavator, a dozer, a loader, a backhoe, a motor grader, a dump truck, or any other earth moving machine. Drivetrain 10 may include engine 12, torque converter 14, input transfer gear 16, transmission 18, and differential 20. Differential 20 may include a pinion. Engine 12 may provide one or more engine parameters 22, either directly or through an electronic module (not shown). Torque converter 14 may provide one or more torque converter parameters 24, either directly or through an electronic module (not shown). Transmission 18 may provide one or more transmission parameters 26, either directly or through an electronic module (not shown).

During operation of the machine, a portion of drivetrain 10 may be active. Engine parameters 22, torque converter parameters 24 and transmission parameters 26 may represent various aspects relating to the operating state of their respective drivetrain components. Engine parameters 22 may include, for example, engine load and engine speed. Torque converter parameters 24 may include, for example, torque converter output speed. Transmission parameters 26 may include, for example, actual gear indication and transmission output speed. It should be appreciated that other parameters may be used depending upon a contemplated embodiment of the disclosed invention.

Figure 2:
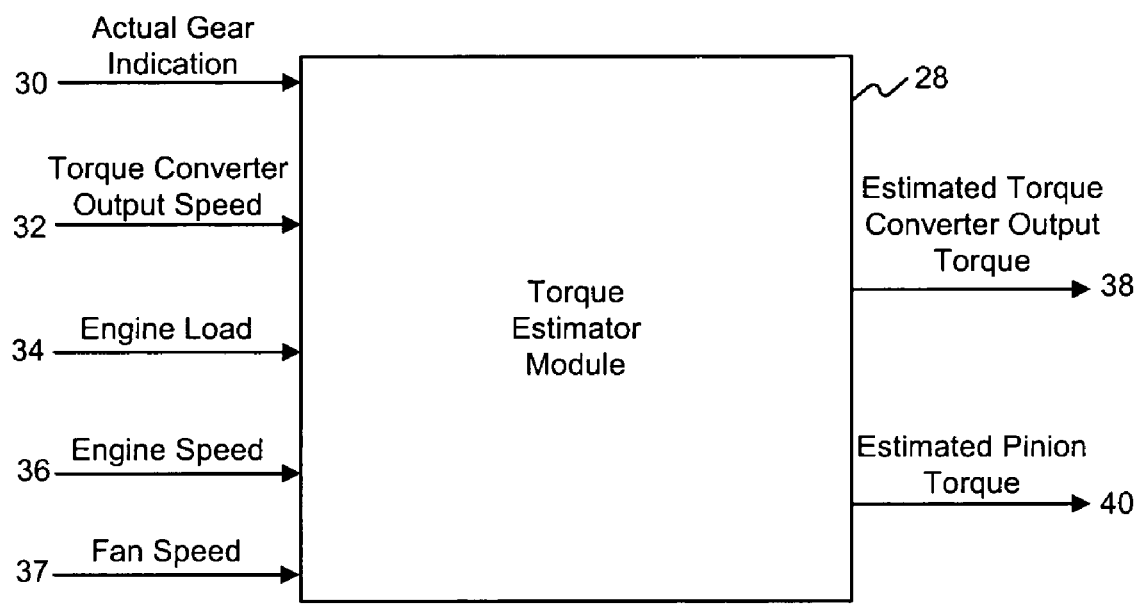
FIG. 2 is a block diagram representation of an exemplary disclosed torque estimator module.

FIG. 2 is a block diagram representation of an exemplary embodiment of a torque estimator module 28. In particular, torque estimator module 28 may receive the following as input: actual gear indication 30, torque converter output speed 32, engine load 34, engine speed 36, and fan speed 37. As an output, torque estimator module 28 may provide an estimated torque converter output torque 38 and an estimated pinion torque 40. The input parameters to torque estimator module 28 may include real time data obtained from sensors or electronic control modules on the machine, derived parameters, parameters received from offboard the machine, or a combination of the above.

Torque estimator module 28 may be a standalone module or may be incorporated into another module such as, for example, a road condition analysis module, an electronic control module, or a machine system monitoring module. Torque estimator module 28 may comprise hardware, software or a combination of hardware and software.

Figure 3:
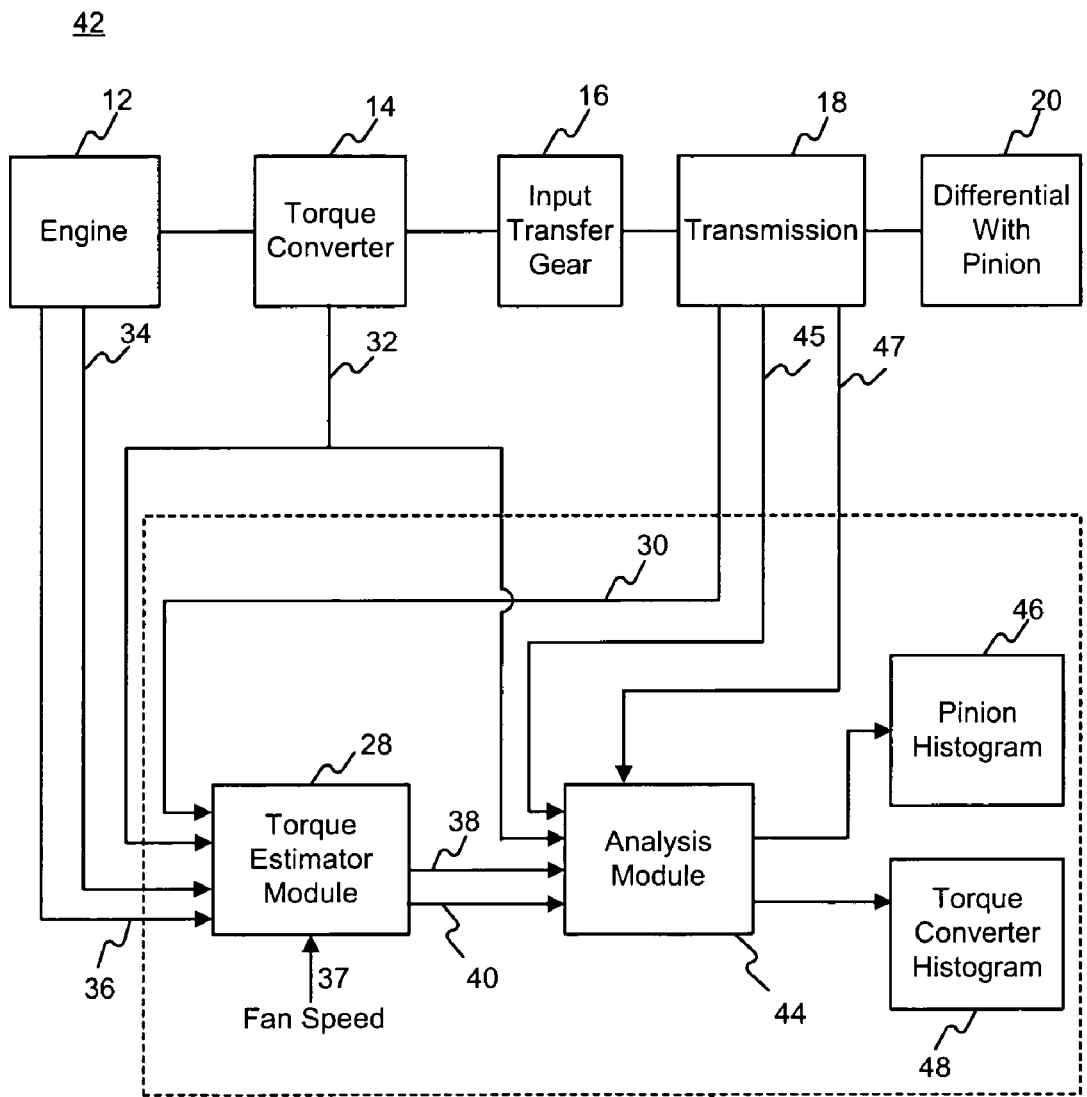
FIG. 3 is a block diagram of an exemplary system for estimating torque and determining imminent drivetrain component failure.

FIG. 3 provides a block diagram representation of an exemplary torque estimator system 42 for estimating torque on a machine and determining imminent drivetrain component failure or damage due to excessive torque. In addition to the components of torque estimator module 28 described above, system 42 may include a computer system 43 having an analysis module 44 that may generate, or update, a pinion histogram 46 and a torque converter histogram 48. Computer system 43 may include torque estimator module 28, pinion histogram 46, and torque converter histogram 48. Analysis module 44 may receive transmission output speed 45 and transmission input speed 47 as parameters. Transmission input speed 47, may be determined for example, by a sensor, or may be derived by multiplying the torque converter output speed 32 by a ratio of the input transfer gear 16.

As described above, torque estimator module 28 can provide estimated torque values for drivetrain components. Analysis module 44 may receive estimated torque converter output torque 38 and estimated pinion torque 40 from torque estimator module 28. Analysis module 44 may then store or log these estimated torque values. Analysis module 44 may update a data structure, such as, for example, a histogram, based on the estimated torque values and/or other parameters.

Pinion histogram 46, for example, may be a two-parameter (or two-dimensional) histogram that may represent estimated pinion torque 38 as one axis, and transmission output speed 45 as another axis, hence the name "two-parameter." In other words, a two-parameter histogram may be a histogram data structure that may be indexed using two parameters (e.g., a two-dimensional array data structure). Because estimated torque alone may be insufficient to assess whether a torque may be excessive, a two-parameter histogram may be used to provide a more accurate representation of potentially excessive torque, for example, by incorporating a second parameter in addition to estimated torque. Analysis module 44 may update the pinion histogram 46 by incrementing a value stored at a location indexed by estimated pinion torque 38 and transmission output speed 45. The values stored at the pinion histogram 46 may represent the number of times that a given estimated pinion torque 38 and transmission output speed 45 were encountered as the torque estimator module periodically determined estimated torque values. As operation of the machine continues, the values stored in the histogram data structure may represent the amount of time that the machine has been at the various combinations of estimated pinion torque 38 and transmission output speed 45.

A region of the pinion histogram 46 may be defined as an excessive torque region. This region of excessive torque may represent those combinations of estimated pinion torque 38 and transmission output speed 45 that may be harmful to one or more components in the machine drivetrain. An excessive torque region may be continuous or discrete. Analysis module 44 may periodically evaluate the values in the excessive torque region of pinion histogram 46. Accordingly, an excessive torque condition may be logged to a memory or storage onboard the machine, provided to a machine operator in the form of an alarm or alert, and/or sent to an offboard system to warn of excessive torque conditions on the monitored component of the machine. For example, analysis module 44 may respond to a pinion histogram 46 value that exceeds a predetermined threshold with a response ranging, for example, from illuminating a warning indicator light to alert the machine operator, to a controlled degrading of the machine performance in order to avoid damage to the drivetrain or other components. Evaluation of the excessive torque region of the histogram and responses to excessive torque events are described in greater detail below.

Similar to pinion histogram 46, torque converter histogram 48 may be a two-parameter histogram and may include transmission input speed 47 as one axis and estimated torque converter output torque 38 as a second axis. Torque converter histogram 48 may be updated and evaluated by analysis module 44 in a similar manner as described above in relation to pinion histogram 46, using transmission input speed 47 and estimated torque converter output torque 38 as the indexing parameters. The same or a different excessive torque region may be defined for torque converter histogram 48.

Analysis module 44 may be a standalone module or may be incorporated into another module such as, for example, a road condition analysis module, an electronic control module, or a machine system monitoring module. Analysis module 44 may comprise hardware, software or a combination of hardware and software.

INDUSTRIAL APPLICABILITY

Although the disclosed system and method for estimating torque has been described in relation to embodiments on a machine, these embodiments are shown and described for purposes of illustration. It should be appreciated that the disclosed system and method may have applications on other machines or devices where monitoring the health of the machine or device may be desired.

The disclosed system and method for providing a torque estimator for a machine may be applicable to any mobile or stationary machine that may include a drivetrain or other components encountering torque for which health monitoring may be desired. The disclosed system and method for providing a torque estimator for a machine may estimate torque based on drivetrain parameters in order to detect and respond to imminent failure or damage of a drivetrain component due to excessive torque on a monitored component.

Several advantages over the prior art may be associated with the disclosed system and method for providing a torque estimator for a machine. For example, the disclosed system and method may be able to determine imminent component failure in real time onboard a machine based on a histogram data structure representing an amount of time the machine has operated at certain combinations of torque and other drivetrain parameters (e.g., a histogram is generated that contains a count value corresponding to an operating time period at an estimated torque value and drivetrain component parameter value combination).

In another example, the disclosed system and method may estimate torque converter output torque and differential pinion torque using a limited set of drivetrain parameters as input, such as, for example, four parameters. Torque estimator module 28 shown in FIG. 2 and described above may estimate torque converter output torque and differential pinion torque using four parameters. Further, the disclosed system and method may be able to determine imminent component failure using an estimated torque value and a drivetrain component parameter based on excessive torque and warn an onboard operator or offboard person or system of the excessive torque condition. Real time estimation of torque and determination of imminent component failure may be aided by reducing required computation cycles through a reduced input parameter set.

The disclosed system and method may be automatically configured on a machine based on a parameter or variable value that identifies the machine type. Using a machine type parameter, an exemplary disclosed torque estimating module may be able to retrieve performance tables or equations that correspond to the machine type. Thus, an exemplary disclosed torque estimating system and method may be used across machines of different types and configurations, and little or no manual configuration may be needed.

Figure 4:
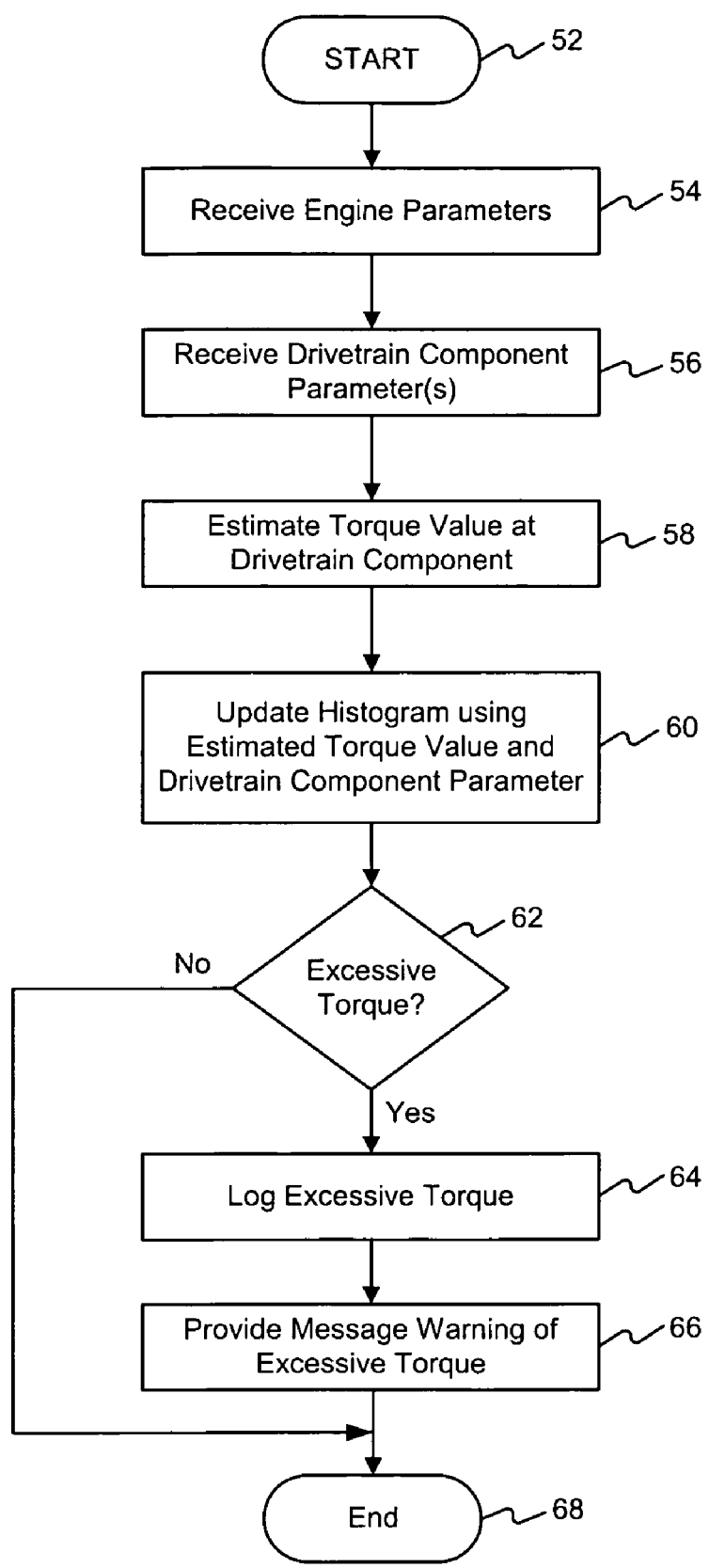
FIG. 4 is a flow chart illustrating an exemplary disclosed method of estimating torque and determining imminent drivetrain component failure.

FIG. 4 is a flow chart 50 illustrating an exemplary disclosed method of estimating torque and determining imminent drivetrain component failure in real time on a machine. In particular, the first step after start (step 52) of the method may include receiving engine parameters (step 54). Drivetrain component parameters may also be received (step 56). Based on the received engine and drivetrain component parameters, an estimated torque value for a monitored drivetrain component may be determined (step 58). Exemplary equations for estimating torque in accordance with the present disclosure are described in greater detail below.

Using the estimated torque value and other drivetrain component parameters, a two-parameter histogram may be updated (or generated) (step 60). The two-parameter histogram may, for example, contain data representing an amount of time a machine has been operating at a given estimated torque value and drivetrain component parameter value. To update the histogram, the estimated torque value and drivetrain component parameter may be used as indices into the histogram data structure and a value at a location indexed by the two indices may be incremented. Using the updated two-parameter histogram, a determination can be made as to whether the torque on a monitored component is excessive (step 62) and whether the machine has been operating at an excessive torque for an amount of time that exceeds one or more thresholds. Excessive torque may indicate imminent drivetrain component damage and/or failure.

If torque on one or more monitored components is determined to be excessive, then the excessive torque event may be logged (step 64) and a message may be provided to warn of the excessive torque (step 66). The message may include an alarm or indication to an operator of the machine. The message may be sent offboard the machine. The excessive torque event log message may be stored onboard the machine for later reporting or analysis. After providing the message, or if no excessive torque was determined, the method ends (step 68). It should be appreciated that the method of FIG. 4 may be repeated at a suitable frequency during the operation of a machine to monitor the drivetrain components.

Figure 5:
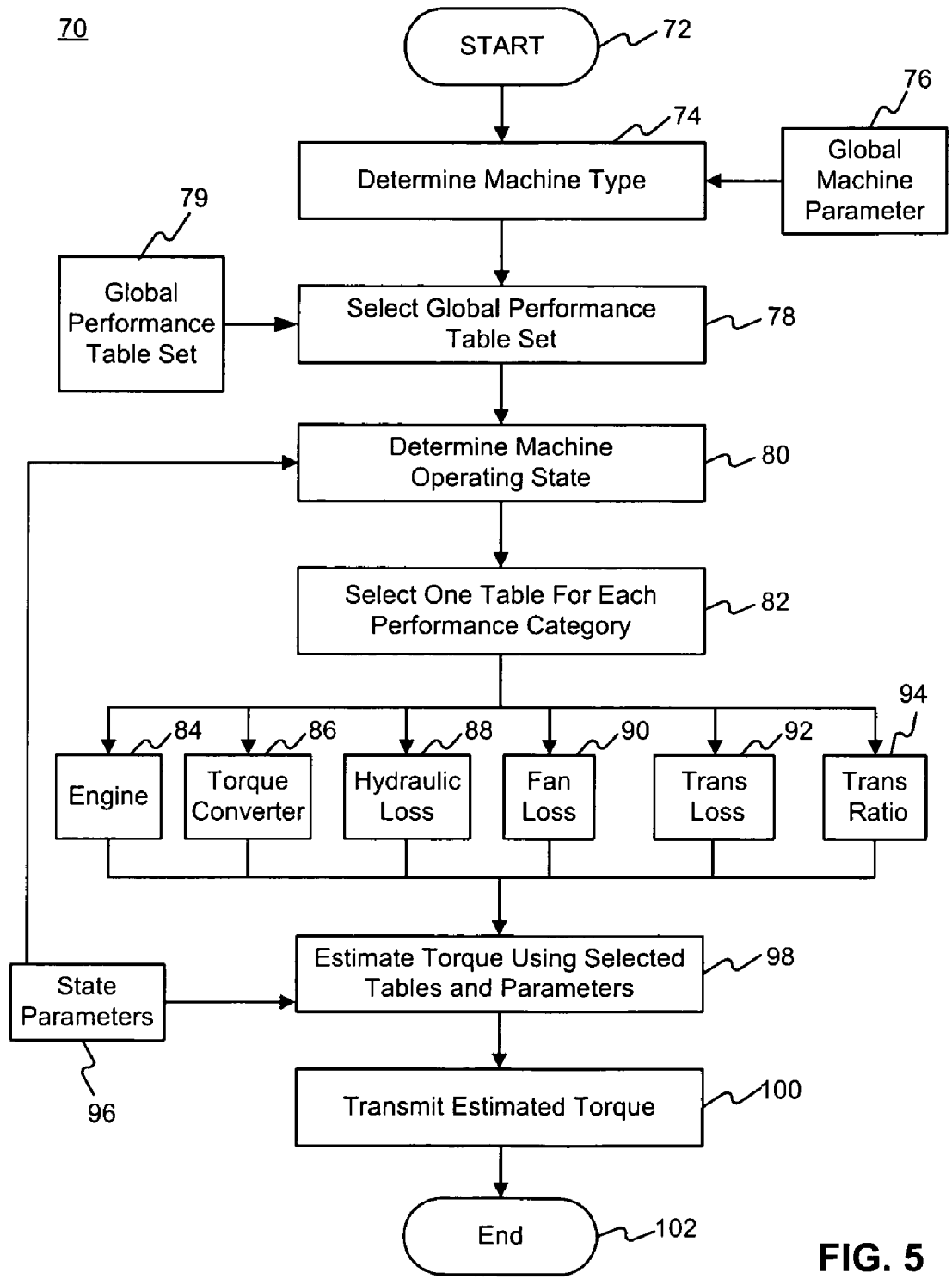
FIG. 5 is a flow chart illustrating an exemplary disclosed method of automatically configuring and operating a torque estimator module.

FIG. 5 is a flow chart 70 illustrating an exemplary disclosed method of automatic configuration and operation of a torque estimator module. In particular, the first step after start (step 72) of the method may include determining a machine type (step 74). A machine type may be a classification of a particular machine type and/or model, such as, for example, a dump truck having a certain drivetrain. Machine type may be determined based on a global machine parameter 76. Global machine parameter 76 may, for example, be a stored software or hardware value that indicates a machine type to onboard systems, including the torque estimator, at start up of the machine or upon request. Global machine parameter 76 may be used by systems on a machine to identify the machine type on which the systems are operating. This information may be useful in configuring systems based on machine type.

Once a machine type is determined, a machine performance table set may be selected (step 78). The machine performance table set may be selected and retrieved from global performance table set 79. The machine type may allow selection and retrieval of a machine performance table set that corresponds to the machine type. A machine performance table set may include tables or equations that represent the performance characteristics of the machine in various operating states, such as, for example, engine performance, torque converter performance, transmission performance, or the like, that may be needed in order to estimate torque and/or to determine excessive torque. For example, an engine performance table may be a look-up table that contains engine torque values associated with a range of both engine speeds and engine loads. Interpolation of values contained in a performance table may be required, such as, for example, when an index value does not exactly correspond to a location in the table. The engine performance table, for example, may be indexed by providing an engine speed and engine load as input and receiving an estimated engine torque as output. The engine torque may then be used in subsequent calculations to determine, for example, torque converter output torque. An equation, such as a curve fitting equation, may be used in place of a performance table. The equation may approximate the values contained in the performance table.

A machine operating state may be determined (step 80). The machine operating state may represent the current operating state or condition of the machine based on measured or sensed parameters received by a module on the machine. The machine operating state may be determined based on state parameters such as, for example, transmission gear, torque converter state, power setting and retarding mode. The operating state may be important for selecting the proper performance table, because the performance tables may be based on different operating states, such as, for example, torque converter lock-up clutch state. For example, if the torque converter lock-up clutch is in an engaged state, then a performance table may be selected that represents the torque converter performance when the lock-up clutch is engaged. Based on the machine operating state, a table may be selected for each performance category (step 82). The performance categories may include engine 84, torque converter 86, hydraulic loss 88, fan loss 90, transmission loss 92, and transmission ration 94. Other performance tables or parameters may be accessed such as, for example, an input transfer gear ratio table. Alternatively, as mentioned above, a curve fitting equation may be selected instead of a table for one or more of the performance categories.

Once the performance category tables or curve fitting equations have been selected, estimated torque values may be calculated (step 98). In addition to the tables (84-94), state parameters 96 may be used in the calculation of estimated torque values. The estimated torque values may be transmitted (step 100) to onboard and/or offboard systems. Estimated torque values may be stored for later use. Estimated torque values may be used by the torque estimator module or transmitted to another module on the machine where the estimated torque values may be used to update a data structure.

After transmitting the torque values, the method ends (step 102). This method may be repeated, wholly or in part, during operation of a machine to provide a desired level of monitoring of torque values on a drivetrain of the machine. For example, this method may be repeated at a rate of about 4 Hz, or any other suitable frequency, to estimate torque on a machine.

Figure 6:
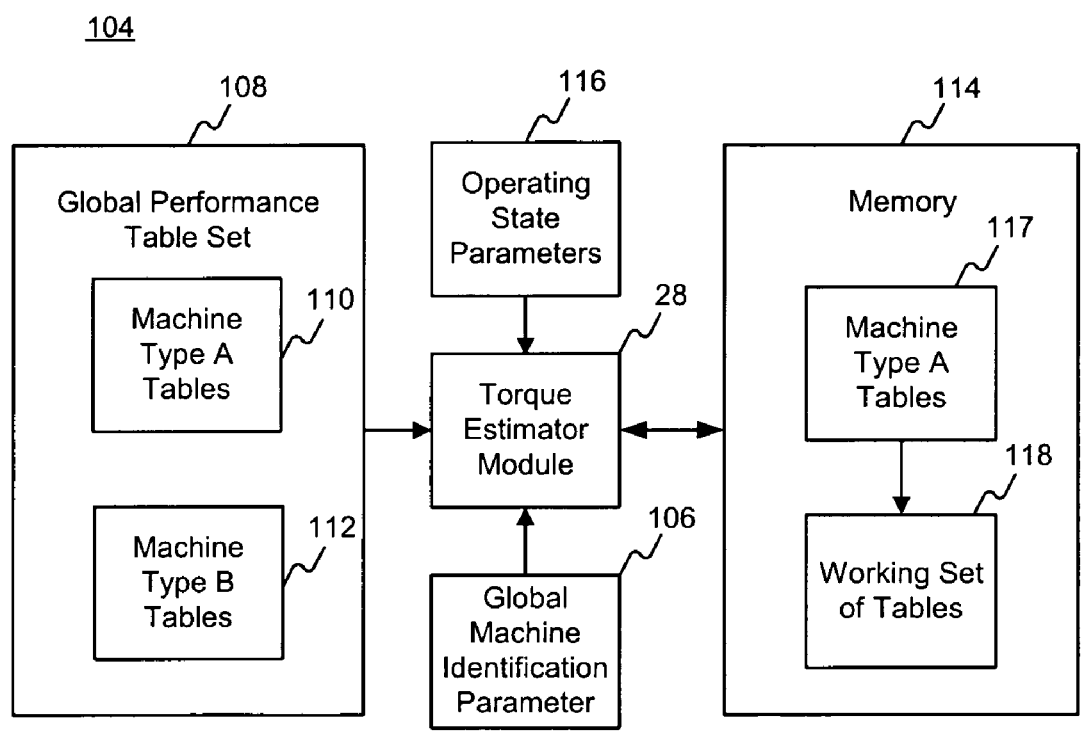
FIG. 6 is a data flow diagram of an exemplary disclosed method for automatically configuring a torque estimator module.

FIG. 6 provides a data flow diagram 104 of an exemplary disclosed method for automatically configuring a torque estimating module. In particular, data items may include global machine identification parameter 106, global performance table set 108 including machine type "A" tables 110 and machine type "B" tables 112, a memory 114, and torque estimator module 28. Memory 114 may be coupled to torque estimator module 28 and may include a copy of machine type "A" tables 117 and a working set of tables 118.

In operation, torque estimator module 28 may receive a global machine identification parameter 106 as input, which may be, for example, set to a value of "A" to denote a machine type "A." Using the machine identification parameter 106, torque estimator module 28 may access global performance table set 108. Global performance table set 108 may comprise performance tables for a variety of machine types, such as, for example, machine type A tables 110 and machine type B tables 112. Based on the machine identification parameter 106, torque estimator module 28 may select machine type "A" tables 110 from the global performance table set 108 and store a copy of the machine type "A" tables 117 in memory 114.

Torque estimator module 28 may also receive operating state parameters 116 as input. Torque estimator module 28 may determine one or more operating states for components on the machine based on the operating state parameters 116. Based on the operating state, torque estimator module 28 may select an appropriate working set of tables 118 from the copy of machine type "A" tables 117 stored in memory 114.

Once an appropriate working set of performance tables and/or equations have been selected, an estimated torque value may be computed. For example, estimated torque values for a torque converter output, a pinion gear, and a final drive shaft may be calculated according to equations 1-3 described below.

A torque converter, such as those that may be commonly found in large construction machines, such as wheel loaders or the like, may include a lock-up clutch. The lock-up clutch, may provide an alternate path which bypasses the torque converter itself. Thus, with the lock-up clutch engaged, the torque delivered by the engine is routed around a torque converter unit, and is applied directly to the torque converter output. The torque converter unit may be the main working portion of the torque converter. When the lock-up clutch is disengaged, the torque from the engine routes directly through the torque converter unit, and is thus controlled by the torque converter by means well known in the art. Although the torque converter unit may not be active in a direct drive state (i.e. when the lock-up clutch is disengaged) there may still be an efficiency loss associated with the torque converter.

Torque estimator module 28 may generate an estimated torque converter output torque, $TC_{out}$ according to Eq. 1 below:

$$TC_{out} = ENG_{(eng\_load,\ eng\_speed)} + TC_{(eng\_speed,\ tc\_out\_speed)} - HYD_{(eng\_speed)} - FAN_{(fan\_speed)} \quad \text{Eq.1}$$

wherein:

$ENG_{(engine\_load,\ engine\_speed)}$ is an engine torque value retrieved from a performance table, or derived from an equation, based on an engine load and an engine speed parameter;

$TC_{(engine\_speed,\ tc\_output\_speed)}$ is a torque converter torque value retrieved from a performance table, or derived from an equation, based on the engine speed, and a torque converter output speed parameter;

$HYD_{(engine\_speed)}$ is a hydraulic loss factor retrieved from a performance table, or derived from an equation, based on the engine speed parameter; and $FAN_{(fan\_speed)}$ is a fan loss factor that may be associated with an non-engine-driven fan and retrieved from a performance table, or derived from an equation, based on a fan speed parameter.

It should be appreciated that for certain operating conditions a parameter may be zero and a corresponding look up table may be filled with a zero value, or a single zero value may be used to eliminate the need for look up table access. For example, Eq. 1 may be used across on a number of different machine types and, as described above, may include a fan loss term that may represent a torque loss associated with an non-engine-driven fan. However, not all machine types may have an non-engine-driven fan. In the case of a machine type that may include an engine-driven fan, a performance table for the fan loss term may comprise all zeroes.

In another example, if the lock-up clutch of torque converter 14 is disengaged, then Eq. 1 may be simplified as indicated below in Eq. 1a:

$$TC_{out} = TC_{(eng\_speed,\ tc\_out\_speed)} \quad \text{Eq.1a}$$

wherein:

$TC_{(engine\_speed,\ tc\_output\_speed)}$ is a torque converter torque value retrieved from a performance table, or derived from an equation, based on an engine speed and a torque converter output speed parameter. When the lock-up clutch is disengaged, the torque converter performance table may reflect the loss associated with operating the torque converter in a direct drive mode.

The simplification of Eq. 1 into Eq. 1a may be possible because when the torque converter lock-up clutch is engaged, the engine torque may be applied directly to the torque converter output. Also, the torque converter torque may reflect any hydraulic loss or fan loss as a result of the direct application of the engine torque to the torque converter output. In other words, with the lock-up clutch engaged, the engine torque may pass directly to the torque converter output and may settle at a steady-state level that may represent any loss due to hydraulics or a fan. It should be appreciated that equations 1 through 3 may be used in a retarding operating condition by reversing applicable signs (i.e., signs for terms that are reversed when a retarding condition is encountered).

Using the torque converter output torque generated by Eq. 1 above, torque estimator module 28 may generate an estimated pinion torque, $T_{pinion}$ according to Eq. 2 below:

$$T_{pinion} = (TC_{out} * ITG\_RATIO - TRANS\_LOSS_{(input\_speed)}) * TRANS\_RATIO_{(gear)} \qquad \text{Eq.2}$$

wherein:
ITG_RATIO represents a gear ratio of an input transfer gear; this term may be applicable only on a drivetrain including an input transfer gear;
$TRANS\_LOSS_{(input\_speed)}$ is a transmission loss (or efficiency) value retrieved from a performance table, or derived from an equation, based on a transmission input speed parameter; and
$TRANS\_RATIO_{(gear)}$ is a transmission gear ratio retrieved from a performance table, or derived from an equation, based on a transmission gear parameter.

Optionally, using the pinion torque value from Eq. 2, a final drive torque may be generated for each of a left or right drive axle according to Eq. 3 below:

$$T_{final\_drive} = (T_{pinion} * BEVEL\_GEAR\_RATIO/2) [* \text{ or}] TQ\_BIAS_{(Tpinion)} \qquad \text{Eq.3}$$

wherein:
BEVEL_GEAR_RATIO is a gear ratio of a bevel gear;
$TQ\_BIAS_{(Tpinion)}$ is a torque bias value based on the pinion torque ($T_{pinion}$); and
the rotation speed of a left drive axle and a right drive axle may also be used, as described below.

As shown above, Eq. 3 includes a multiply or divide operation preceding the $TQ\_BIAS_{(Tpinion)}$ term. The decision to multiply or divide may be based on two factors: the axle for which final drive torque is being calculated and the rotation speeds of a left drive axle and a right drive axle. An open differential nominally, or ideally, may provide the same torque to both the left and right drive axles. However, friction may result in a torque bias between the two axles. If the axle for which torque is being calculated is the faster rotating axle, then a multiplication operation is used for the $TQ\_BIAS_{(Tpinion)}$ term, and if the axle is the slower axle then a division operation is used for the $TQ\_BIAS_{(Tpinion)}$ term. The distinction between multiply and divide operation represents the way in which torque bias is affecting the axle for which final drive torque is being calculated. That is, when one axle has more friction than the other axle, the axle with more friction may suffer from a loss of torque transmitted by the axle. In another embodiment, torque bias between the left and right drive axles may not be taken into account, accordingly, in such an embodiment, the $TQ\_BIAS_{(Tpinion)}$ term and its preceding operator may be may be omitted from Eq. 3.

Figure 7:
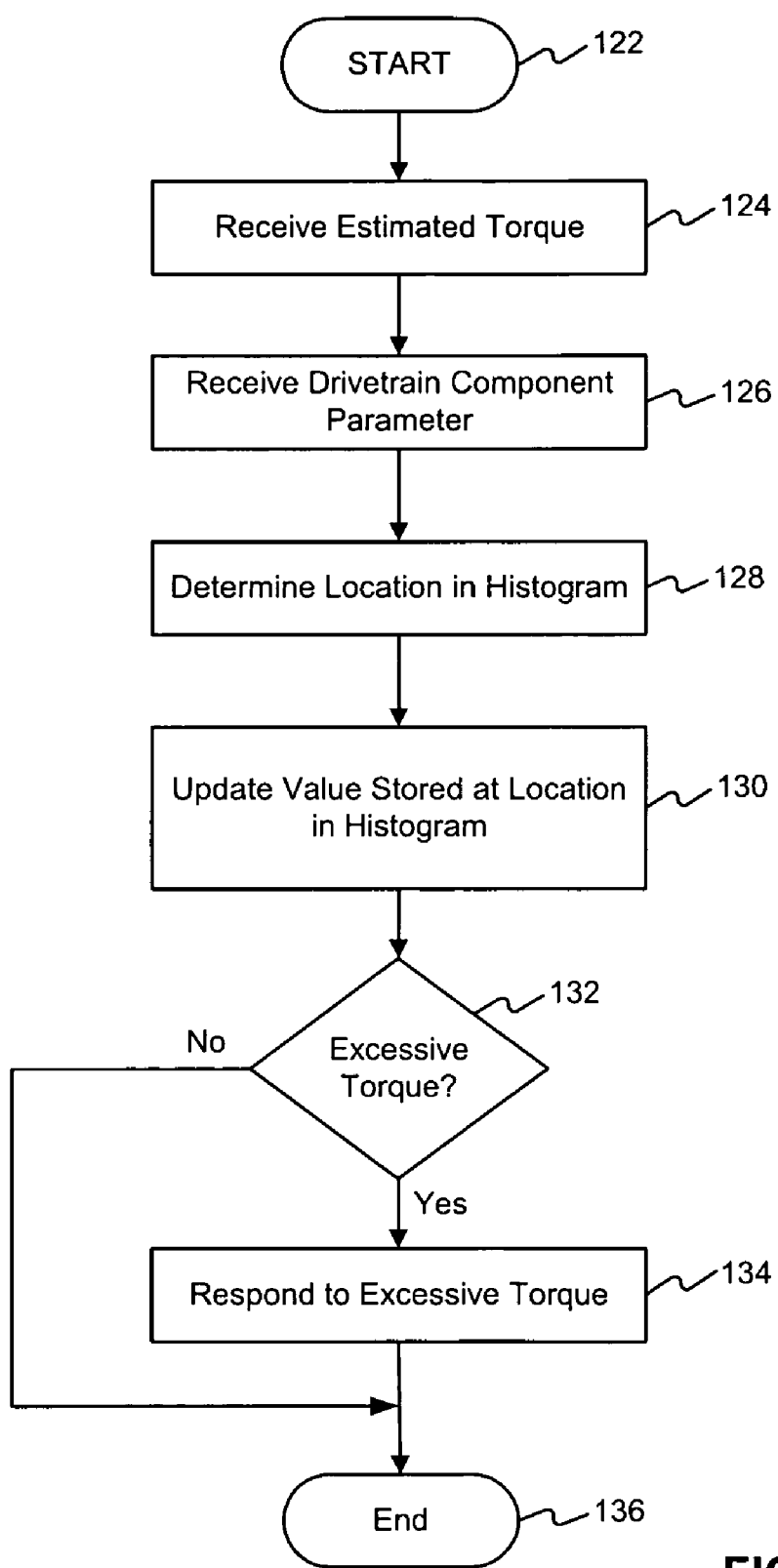
FIG. 7 is a flowchart illustrating an exemplary disclosed method of storing and evaluating torque data.

Once generated, torque values may be used to determine imminent component damage or failure on a machine. FIG. 7 is a flowchart 120 illustrating an exemplary disclosed method of storing and evaluating torque estimate data that may be generated by torque estimator module 28 according to the equations described above. In particular, the first two steps after start (step 122) of the method may include receiving an estimated torque (step 124) and receiving a drivetrain parameter (step 126). Next, using the estimated torque and drivetrain parameter as index values, a location within a histogram data structure may be determined (step 128). For example, the histogram data structure may be represented as a two-dimensional array in memory and the estimated torque and the drivetrain parameter may be used as the two index values to identify a storage location within the array.

Once a location within the histogram data structure has been determined, a value stored at that location may be updated (step 130), such as, for example, by incrementing the value stored at the location. Incrementing the value may represent an additional period of time for which the machine drivetrain may have operated at about a level approximated by the estimated torque and drivetrain component parameter. For example, if a frequency of determining estimated torque is 4 Hz, then an estimated torque value of 1000 units and a drivetrain parameter of 100 revolutions per minute (RPM) may indicate that for a time period of 0.25 seconds (i.e., 1 second/4 Hz) the monitored drivetrain component was operating at approximately 1000 units of torque at an RPM of 100. It should be appreciated that a frequency of determining estimated torque may be varied according to a desired resolution of monitoring the drivetrain components. It should also be appreciated that different methods of modifying a data structure location could be used, such as, for example, subtracting from a preset value (e.g. a countdown scheme) such that when a value in the location reached zero, or a predetermined level, an action may be taken.

Once the data structure has been updated, a region of the data structure may be evaluated for excessive torque (step 132). This may include evaluating data values stored in a region of the histogram data structure defined as an excessive torque region. An excessive torque region of the histogram may be defined as a range, or ranges of estimated torque value and a corresponding range or ranges of the drivetrain parameter value. Values contained in the excessive torque region may be compared to one or more threshold levels. The threshold levels may have a response associated with each threshold. For example, a first threshold level may have an associated response of illuminating an indicator light. The excessive torque region is discussed in greater detail below.

In an exemplary embodiment, if a threshold level is met or exceeded, then a corresponding response action may be taken (step 134). Once a corresponding response is taken to a met or exceeded threshold level, or if there no excessive torque was determined, the method ends (step 136). It should be appreciated that the method may be repeated in whole, or in part, as may be suitable to provide monitoring of drivetrain components. For example, the method may be repeated at a rate corresponding to a rate of determining estimated torque values.

Figure 8:
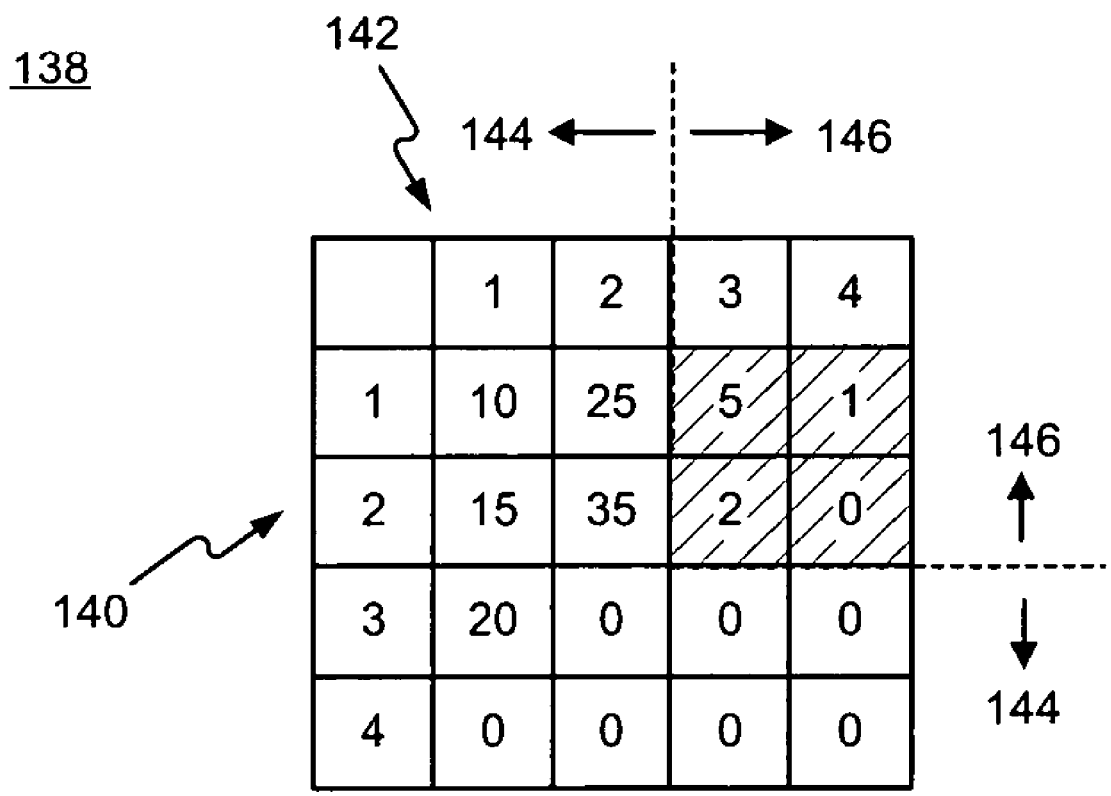
FIG. 8 is a diagrammatic representation of an exemplary histogram data structure for storing estimated torque information.

FIG. 8 is a diagrammatic representation of an exemplary portion of a histogram data structure 138 for storing estimated torque information. In particular, histogram data structure 138 may comprise a first axis 140, a second axis 142, a non-excessive torque region 144, and an excessive torque region 146. First axis 140 may represent estimated torque, for example. Second axis 142 may represent an RPM value of a drivetrain component, for example. Storage locations of excessive torque region 146 are indicated in FIG. 8 by a diagonal fill pattern.

The histogram data structure 138 may be accessed based on the estimated torque value and the drivetrain component parameter (RPM). For example, the location corresponding to an estimated torque value of 1 and an RPM of 2, may contain a value of 25. This may indicate that the machine has spent 25 time periods operating at a torque of about 1 and an RPM of about 2. This location is in the non-excessive torque region 144 of the histogram data structure 138. An update to the data structure may be performed by incrementing the value of 25 to a value of 26 in the location of the histogram data structure.

An excessive torque event may occur, for example, when the estimated torque has a value of 2 and the RPM has a value of 3. The corresponding location of the histogram data structure contains a value of 2. This location may be in the excessive torque region 146 of the histogram data structure 138. After updating the value from 2 to 3, an analysis module may evaluate the updated value of 3 against one or more threshold levels as described above. If the updated value of 3 meets or exceeds a threshold value, then an associated response action may be taken. It should be appreciated that comparison of a histogram value with a threshold level may be performed using various mathematical evaluations, such as, for example, less than, greater than, equal to, less than or equal to, greater than or equal to, or a combination of the above.

Values in the histogram data structure may be cleared, reset to a default value, or set to zero periodically. For example, the histogram values may be cleared or reset at machine start-up, shut-down, after a transfer of the histogram data to an off-board system has occurred, at the request of an operator, at the request of another system, or at the occurrence of another command or condition where clearing or resetting of the histogram values may be suitable.

A multi-tiered threshold configuration may be defined for the excessive torque region 146 of histogram data structure 138. For example, a first threshold level may defined such that when a value within the excessive torque region 146 of histogram data structure 138 reaches or exceeds the first threshold level, a response action is taken, such as, for example, illuminating an indicator light. A second threshold level may be set higher than the first threshold level, such that when a value in excessive torque region 146 of histogram data structure 138 reaches or exceeds the second threshold value, a response action may be taken that may demand more machine operator attention, such as, for example, a buzzer sounding in the machine cab. A third threshold level may be set higher than the second threshold level, such that when a histogram value in excessive torque region 146 of histogram data structure 138 reaches or exceeds the third threshold value, a response action may be taken that may attempt to prevent or reduce damage to the machine, such as, for example, degrading performance of the machine such that the excessive torque condition is reduced or eliminated. An example of degrading performance of the machine may include reducing a power setting, or any performance altering change up to and including shutting down the machine.

A bypass of the performance degrading function may be included in order to allow an operator of a machine to continue to operate the machine in an emergency, even though excessive torque may be detected on a drivetrain component of the machine. The bypass feature may allow an operator of the machine to use human judgment in situations where excessive torque may be needed to avoid a potentially more damaging or dangerous situation.

It should be appreciated that the above examples of three threshold levels and the corresponding responses are for illustration purposes only and a different number of threshold levels with different corresponding responses may be used depending on a contemplated use of the disclosed invention.

It will be apparent to those skilled in the art that various modifications and variations can be made to the disclosed torque estimator for a machine. Other embodiments will be apparent to those skilled in the art from consideration of the specification and practice of the disclosed system and method for providing a torque estimator for a machine. It is intended that the specification and examples be considered as exemplary only, with a true scope being indicated by the following claims and their equivalents.

What is claimed is:

1. A computer system for monitoring a drivetrain component of a machine, the computer system comprising:
    a torque estimator module disposed on the machine and configured to:
        receive a plurality of engine parameters;
        receive a drivetrain component parameter;
        determine an estimated torque value at the drivetrain component based on the plurality of engine parameters and the drivetrain component parameter; and
    an analysis module disposed on the machine and configured to:
        receive the estimated torque value from the torque estimator module and receive the drivetrain component parameter;
        update a histogram data structure based on the estimated torque value and the drivetrain component parameter; and
        evaluate the histogram data structure in order to determine whether the drivetrain component is experiencing an excessive torque corresponding to a value of the histogram data structure exceeding a threshold.

2. The computer system of claim 1, wherein the plurality of engine parameters includes an engine speed and an engine load.

3. The computer system of claim 1, wherein the drivetrain component parameter includes a torque converter output speed.

4. The computer system of claim 1, wherein the estimated torque value includes an estimated pinion torque and the drivetrain component parameter includes a transmission output speed.

5. The computer system of claim 1, wherein the estimated torque value includes an estimated torque converter output torque and the drivetrain component parameter includes a transmission input speed.

6. A method for determining torque on a drivetrain component of a machine, the method comprising:
    receiving a plurality of engine parameters;
    receiving a drivetrain component parameter;
    determining an estimated torque value at the drivetrain component based on the plurality of engine parameters and the drivetrain component parameter;
    providing the estimated torque value and the drivetrain component parameter to an analysis module located on the machine;
    determining a location in a data structure using a combination of the estimated torque value and the drivetrain component parameter as an index into the data structure;
    updating a value stored at the location in the data structure; and
    evaluating whether the histogram data structure indicates an excessive torque condition corresponding to the value stored in the histogram data structure exceeding a threshold.

7. The method of claim 6, further including transmitting a message to indicate the excessive torque condition.

8. The method of claim 6, wherein receiving the drivetrain component parameter includes receiving a torque converter output speed.

9. The method of claim 6, wherein receiving the drivetrain component parameter includes receiving a transmission actual gear value.

10. The method of claim 6, wherein the data structure includes a two-parameter histogram including a first axis representing an estimated pinion torque and a second axis representing a transmission output speed.

11. The method of claim 6, wherein the data structure includes a two-parameter histogram including a first axis representing the estimated torque value and a second axis representing the drivetrain component parameter, the estimated torque value including an estimated torque converter output torque and the drivetrain component parameter including a transmission input speed.

12. A computer readable medium for use on a computer system, the computer readable medium having computer executable instructions for performing a method comprising:
  receiving a first engine parameter and a second engine parameter;
  receiving a drivetrain component parameter;
  determining an estimated torque value at the drivetrain component based on the plurality of engine parameters and the drivetrain component parameter;
  providing the estimated torque value and the drivetrain component parameter to an analysis module;
  updating a histogram data structure based on the estimated torque value and the drivetrain component parameter; and
  evaluating whether the histogram data structure indicates an excessive torque condition corresponding to a value of the histogram data structure exceeding a threshold.

13. The computer readable medium of claim 12, wherein:
  the value of the histogram data structure includes a frequency of a combination of a particular estimated torque value and a particular drivetrain component parameter; and
  the method further includes evaluating an excessive torque region of the histogram data structure to determine whether the frequency exceeds the threshold.

14. A machine comprising:
  a drivetrain including at least one component;
  a torque estimator module configured to estimate torque on the at least one drivetrain component;
  an analysis module configured to:
    receive a torque estimate from the torque estimator module;
    receive a drivetrain component parameter;
    update a data structure based on the torque estimate and the drivetrain component parameter; and
    determine whether the data structure indicates that a frequency of a combination of a particular torque estimate and a particular drivetrain component parameter exceeds a threshold within an excessive torque region of the data structure.

15. The method of claim 6, further including:
  degrading the performance of the machine if the estimated torque value at the drivetrain component is excessive.

16. The machine of claim 14, wherein the analysis module is further configured to degrade the performance of the machine if the data structure indicates that the frequency of the combination of the particular torque estimate and the particular drivetrain component parameter exceeds the threshold.

17. The machine of claim 14, wherein the torque estimator module is further configured to:
  determine a machine type based on a machine identification parameter;
  select a set of machine performance tables from a global set of performance tables based on the machine type;
  determine a machine operating state;
  select at least one working performance table from the set of machine performance tables, based on the operating state; and
  determine the estimated torque on the at least one drivetrain component using the at least one working performance table.

18. The method of claim 6, further including:
  providing a global set of performance tables including at least one set of machine performance tables;
  providing a machine identification parameter;
  determining a machine type based on the machine identification parameter;
  selecting a set of machine performance tables from the global set of performance tables based on the machine type;
  determining a machine operating state; and
  selecting at least one working performance table from the set of machine performance tables, based on the operating state, wherein the estimated torque value is determined using the at least one working performance table.

19. The computer system of claim 1, wherein:
  the value of the histogram data structure includes a frequency of a combination of a particular estimated torque value and a particular drivetrain component parameter; and
  the analysis module is configured to determine whether the drivetrain component is experiencing the excessive torque when the histogram data structure indicates that the frequency exceeds the threshold.

20. The computer system of claim 1, wherein the analysis module is further configured to evaluate an excessive torque region of the histogram data structure in order to determine whether the drivetrain component is experiencing the excessive torque corresponding to the value of the histogram data structure exceeding the threshold within the excessive torque region of the histogram data structure.

* * * * *